DATA CONVERSION APPARATUS

Filed April 8, 1963 4 Sheets-Sheet 1

HAROLD R. DELL
EDWARD E. GRAY
LORANT E. FRANK
JOHN R. STOLTZ
INVENTOR

BY Frederick J. Smyth

ATTORNEY

HAROLD R. DELL
EDWARD E. GRAY
LORANT E. FRANK
JOHN R. STOLTZ
INVENTORS

BY [signature]
ATTORNEY

HAROLD R. DELL
EDWARD E. GRAY
LORANT E. FRANK
JOHN R. STOLTZ
INVENTOR

BY Frederick J. Smyth [signature]
ATTORNEY

Dec. 15, 1964 H. R. DELL ETAL 3,161,458

DATA CONVERSION APPARATUS

Filed April 8, 1963 4 Sheets-Sheet 4

HAROLD R. DELL
EDWARD E. GRAY
LORANT E. FRANK
JOHN R. STOLTZ
INVENTOR

BY Frederick J. Smyth
ATTORNEY

United States Patent Office 3,161,458
Patented Dec. 15, 1964

3,161,458
DATA CONVERSION APPARATUS

Harold R. Dell, Palo Alto, Edward E. Gray, Mountain View, Lorant E. Frank, Palo Alto, and John R. Stoltz, Menlo Park, Calif., assignors to General Precision, Inc., Binghamton, N.Y., a corporation of Delaware Filed Apr. 8, 1963, Ser. No. 271,167
8 Claims. (Cl. 346—110)

This invention relates to a data conversion apparatus and more particularly to an apparatus for converting data stored on magnetic tape into the form of data stored on photographic film.

As is well known in the prior art, there are a number of devices capable of storing large amounts of information in permanent form, which information can thereafter be employed by computing machines or the like in arriving at new or combined information. Listed among such devices are printed records, punched cards, paper tape, and magnetic disks or tapes. In selected applications, where in it is desirable to store large amounts of information, yet retain the capability of altering such information, as necessary, magnetic tape has usually been selected as the storage medium.

In general, information is stored on magnetic tape in digtal form wherein the presence or absence of a magnetic spot is representative of each individual digital datum. Such data, while readily produced or processed by computing machines, is not easily interpreted by human intelligence and, further, since it is generally necessary to limit the amount of stored information in large scale systems, the invariant data associated with the usual printed records and/or forms are usually not converted into magnetic spots on the tape during the time the variable data is being transcribed therefrom.

Accordingly, there is provided by the invention, an improved data conversion apparatus which accepts data from magnetic tape and provides a printed record of the combined variable and invariant data, under magnetic tape control, which is readily decipherable without the use of an auxiliary machine reader or the like. Briefly, the invention comprises an appartus operable to first convert data processed on magnetic tape into visual information which is thereafter photographed and processed onto microfilm. Through the use of microfilm, rapid access to data is still retained, while, simultaneously, the volume of storage space required for the permanent record is drastically reduced. The apparatus generates alpha-numeric characters and images these characters together with a selected one of a plurality of fixed data formats, frame by frame, upon conventional movie film, wherein the character and symbol data is recorded in conventional typewritten page format. Additionally, the capability of generating film identification labels in large type is provided. Although the exposed film is the basic output of the system, single frame photographs are available through the use of an auxiliary camera. As will be understood from the detailed description to follow, the data conversion apparatus of the invention includes an improved character generator of the type disclosed in copending application Serial No. 850,308, now Patent No. 3,090,041, filed November 2, 1959, on behalf of Harold R. Dell and assigned to the assignee of this application, together with a cathode ray tube, a film transport system, a precision format overlay slide projector, a bar-code generator, an identification label generator, an auxiliary camera, and appropriate optics and control circuits.

Thus, an object of the invention is to provide an improved data conversion apparatus.

Another object of the invention is to provide an appartus for converting data stored on magnetic tape into data stored on microfilm.

Yet another object of the invention is to provide an apparatus for combining variable data stored on magnetic tape with one of a plurality of fixed data formats in readily decipherable form.

Still another object of the invention is to provide an apparatus for converting data processed on magnetic tape into visual information which is thereafter photographed and processed on microfilm.

A related object of the invention is to provide an improved apparatus for converting data stored on magnetic tape into visual alpha-numeric characters.

A further object of the invention is to provide an improved data conversion apparatus for combining variable data stored on magnetic tape with invariant data stored on a predetermined format wherein the combined data is readily decipherable and yet occupies a smaller volume than the variable data alone.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

FIGS. 6A to 6D further illustrate the operation of the apparatus.

Figure 1:
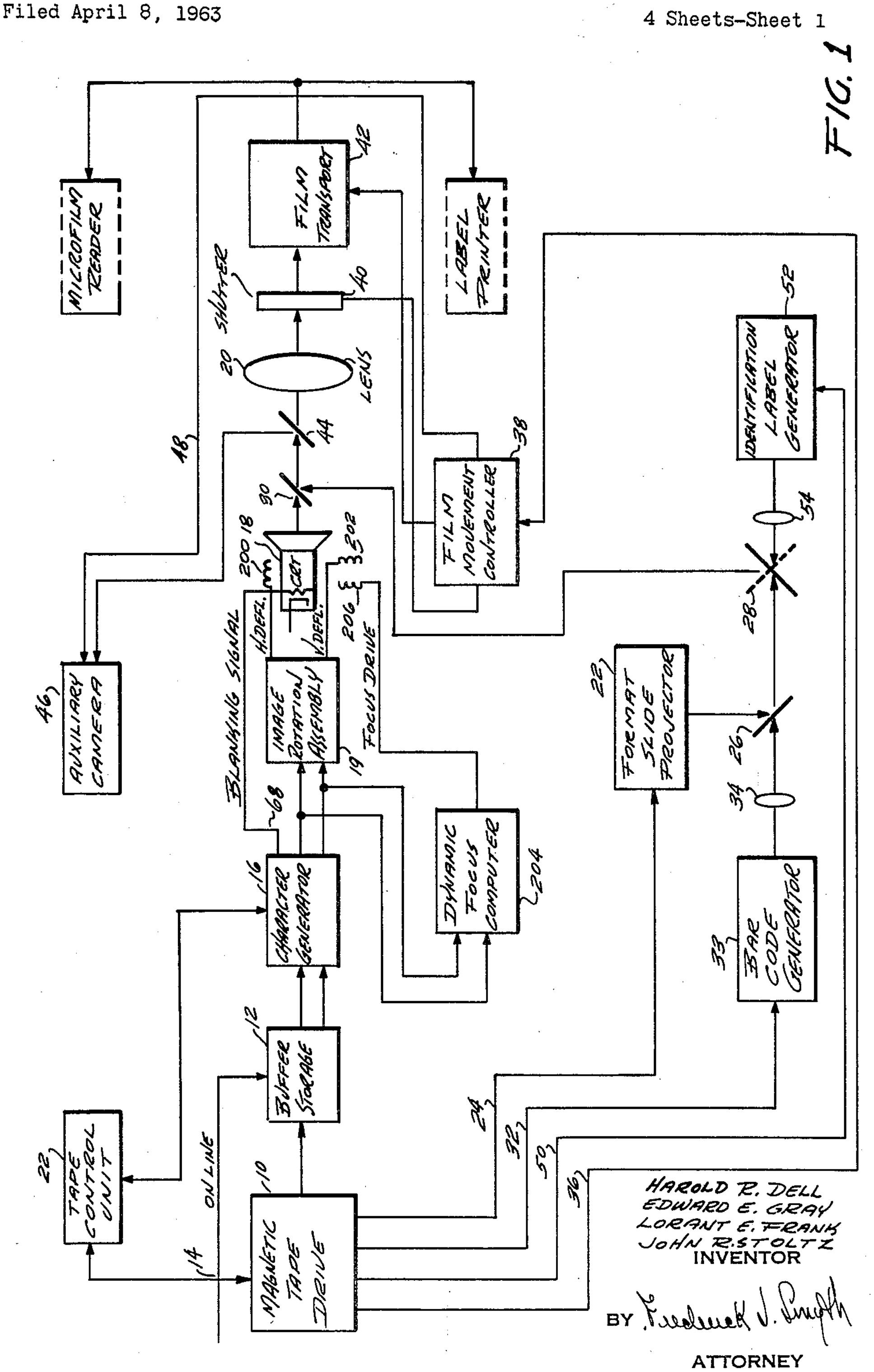
FIG. 1 is a block diagram of a preferred embodiment of the apparatus of the invention.

Referring now to the drawings a block diagram of a preferred embodiment of the apparatus of the invention is illustrated in FIG. 1. As there shown, a magnetic tape drive unit 10 transmits the variable data to be filmed to a buffer storage device 12 and also predetermined instruction and control signals to other units of the apparatus as will be better understood as the description proceeds. Buffer storage unit 12 is necessary when extremely high speed tape drives are employed wherein data is available at a rate greater than that at which the remainder of the system operates. Alternatively, of course, on line operation may be utilized by means of a line 14, when the data is available at a rate less than that at which the remainder of the system operates, the necessary instruction and control signals being directly applied to various units of the system as necessary. The output of buffer storage unit 12 is fed to a character generator 16, character by character. Character generator 16 is operable to provide the necessary horizontal and vertical deflection signals as well as an intensity blanking signal to a conventional cathode ray tube 18, whereby the alpha-numerical character defined by the digital signals from buffer 12 is converted to visual information on the face of cathode ray tube 18. This feature is attained by successively positioning the electron beam of cathode ray tube 18 to trace out each character on the face of tube 18, one at a time. During the time interval when the beam traverses a discontinuity in a character, or when it moves between characters, it is blanked out by a blanking signal applied to the control grid of tube 18. The horizontal and vertical deflection signals provided by character generator 16 are first passed through an image rotation assembly 19 before being applied to tube 18. Assembly 19 is selectively operable to either pass the deflection signals directly to the horizontal and vertical deflection coils associated with tube 18 or to interchange the horizontal and vertical deflection signals to thereby rotate the image appearing on the face of tube 18 through an angle of 90°. A tape control unit 22 is employed to advance tape drive unit 10 when character generator 16 has completed a character, a line, or a frame.

Light from the face of the cathode ray tube passes through a lens 20 and is focused thereby onto the aperture of a film transport mechanism, exposing a frame of film. Simultaneously, a command from the tape drive unit 10 is applied to a format slide projector 22 along a line 24 to position a selected format slide in a proper viewing location. Light transmitted through the format slide is initially reflected by a beam splitter 26 and then by the mirror in a beam shifter 28 towards a further beam splitter 30. The latter beam splitter effectively superimposes the format, or invariant data, with the character, or variant, data generated upon the face of the cathode ray tube. Lens 20 focuses the properly formated and registered page of characters upon the film. Further, a signal from the magnetic tape drive unit 10 along a line 32 is directed to a bar code generator 33 to select an appropriate bar code which is imaged in the form of luminous lines on a lens replacing the ground glass screen normally used for display. The image of the code bars is reduced by a reducing lens 34 and is superimposed on the format image in beam splitter 26. Thus, the film may be exposed simultaneously to the bar code, the page format, and the page characters. As soon as one frame has been completed a signal from magnetic tape drive unit 10 along a line 36 to a film movement controller unit 38 causes a shutter 40 to close and operate a film transport unit 42 to thereby advance the film to the next frame. Changes in the bar code are synchronized with the film movement so that they occur during the time shutter 40 is closed.

Before the combined beam of light enters lens 20, which is effective to focus the light on the film in film transport 42, the image passes through yet another beam splitter 44 which diverts a small portion of the light to selectively expose a picture on an auxiliary camera 46. When a photograph is taken by camera 46, its shutter is synchronized by a line 48 so that it opens just before the character generator begins to write characters on the face of cathode ray tube 18 and closes after the last line has been completed.

In order to produce identification labels, beam shifter 28 is rotated to its alternate position by means of a switch on the master control panel or by a control code from magnetic tape drive unit 10. Codes from drive unit 10 then actuate, along a line 50, an identification label generator 52 which images the label information in the form of luminous digits and characters on a lens within generator 52. The label image is reduced by a reducing lens 54, reflected by beam shifter 28 and beam splitter 30, and focused upon the film transport aperture to expose the film. Generally, the label consists of two rows of five characters each. The first two or three digits of the top row display a city code, by way of example; the remaining digits of the top row are used for a classification code. The bottom row contains the date with the first three letters of the month occupying the space of one character. Film movement controller 38, upon command of tape drive unit 10, causes repeated exposure of the label on four successive frames.

Mailing labels in the frame format mode are generated by the apparatus of the invention in the same manner as the normal data except that format slide projector 22 and bar code generator 33 are turned off. In the line format, however, the ability to adjust the film advance, and hence the length of frames, is now used to obtain a frame length containing an integral number of lines with no gaps at the top or bottom of the frame. Thus, as the frame is advanced, there is no more than the normal line separation between the bottom line of one frame and the top line of the next frame, resulting in a film strip with a continuous succession of written lines.

An an aid in understanding the operation of the apparatus shown in FIG. 1, a brief description of the system is next outlined in tabular form, with the manual operations identified by letters and the tape commands designated by numbers. A conventional console is, of course, used by the operator to control system operation.

*Normal Data Format Mode*

(A) The film magazines in the system are loaded and threaded into film transport 42. It is necessary that the magazine is properly positioned, since an interlock device prevents further operation.

(B) Power is applied to the apparatus and format slide projector 22 is turned on.

(C) The tape is started.

(1) Select the proper format overlay slide in format slide projector 22 under control of a signal on line 24.

(2) Select the proper bar code in bar code generator 33 under control of a signal on line 32.

(3) Energize the bar code lights.

(4) Open film transport shutter 40.

(5) Start writing data.

(6) "Carriage return" at the end of first line.

(7) Continue writing data and "carriage returns."

(8) Turn off bar code lights.

(9) End of frame.

(10) Close film transport shutter 40.

(11) Move to next frame.

(12) Repeat cycle from 2 to 11.

*Quick Photo of Single Frame*

(D) Enable the shutter on auxiliary camera 46.

(13) When next frame ends, the shutter of auxiliary camera 46 opens.

(14) Cycle from 2 to 10 occurs.

(15) The shutter of auxiliary camera 46 closes.

(E) Photo is developed.

*Side by Side Data Format Made*

(F) Transfer the switch controlling image rotation assembly 19 to the Side by Side selection position.

(C) Start the tape.

(16) Select the proper side by side format overlay slide in format slide projector 22 under control of a signal on line 24.

(17) Repeat cycle 2 to 11.

*Identification Labelling*

(G) Transfer the mode selector switch to the Identification Label position.

(C) Start the tape.

(18) Select the proper identification label in generator 52 under control of a signal on line 50.

(4) Open shutter 40.

(10) Close shutter 40.

(11) Move to next frame.

(19) Repeat cycles 18, 4, 10 and 11 four times to obtain four successive labels.

*Mailing Label Production*

(H) The mode selector switch is set to the moding label position and is effective to extinguish the light sources in both format slide projector 22 and bar code generator 33.

(I) Adjust film transport unit 42 to obtain the desired film advance.

(C) Start the tape.

(20) Repeat cycles 4 through 11 with the exception of 8.

When the end of a tape reel is reached, the apparatus automatically switches to another tape transport and continues to run. The original reel is then rewound and a warning light is operated to inform the operator that the original reel should be replaced, all, as will be understood by those skilled in the art, as is conventional in large scale digital computer operation.

As more fully shown in FIG. 2, character generator 16 is an improved version of the generator disclosed in the hereinabove reference co-pending application wherein alpha-numerical characters are formed by a series of overlapping dots upon the face of a cathode ray tube, with each character developed from a sufficient number of dots in order to assure high definition. Each character to be displayed is indexed to a predetermined co-ordinate position on the cathode ray tube and thereafter minor deflection voltages are selectively added to the major deflection voltages to sequentially form the desired character, the electron beam of the cathode ray tube being blanked during the time intervals that the major and minor deflection voltages are being altered. By way of example, characters are formed as shown in FIG. 3, wherein 66 indicates the spot position directed by the major deflection voltages, it being remembered that while the electron beam of the cathode ray tube is being deflected to this position blanking signal along a line 68 (see FIG. 1) is effective to prevent illumination of the screen at this time. As can be seen in FIG. 3, a specific character, such as the letter "T," is formed by a series of overlapping beam positions indicated by the numerals one through nine. It should be noted that the number of beam positions, or dots, is dependent upon the symbol definition and character size required. By means of drawings such as FIG. 3, dots, consistent with the dot size obtainable from the cathode ray tube being used, are drawn to scale, overlapping along such line of the character. From such diagrams, the necessary minor horizontal and vertical deflections for each spot position are readily ascertainable. Thereafter, knowing the deflection sensitivity of the display apparatus employed in the system, the minor horizontal and vertical deflection voltages to be selectively added to the major horizontal and vertical deflection voltages which define position 66, the suborigin point, are readily determined.

Figure 3:
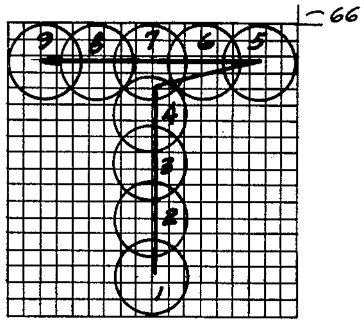
FIG. 3 illustrates the operation of the apparatus of FIG. 2.
Figure 4:
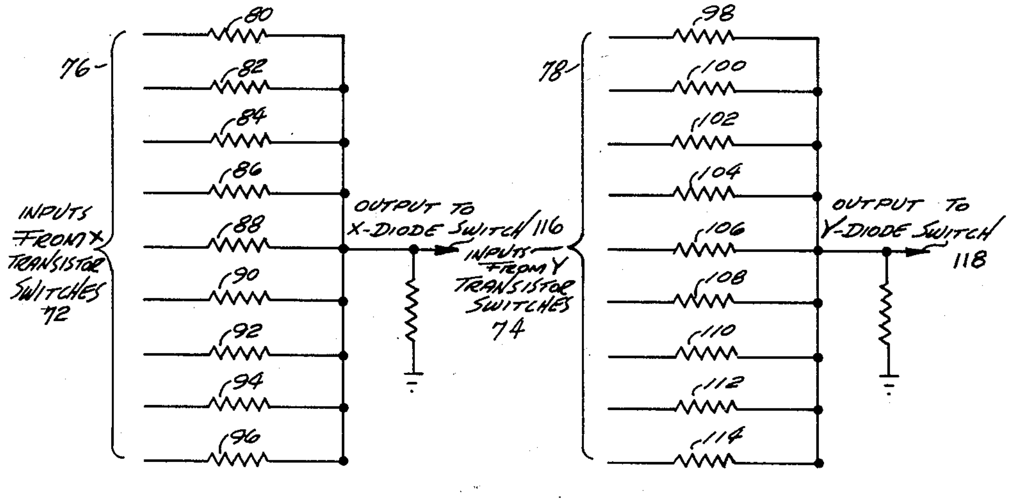
FIG. 4 is a schematic diagram of a portion of the appartus of FIG. 2.

In the apparatus of the invention, the actual dot deflection voltages are derived from a plurality of precision resistor networks, with the output voltages from separate horizontal and vertical networks supplying the minor deflection signals which thereafter are driven by a pair of precision transistor switches 72 and 74 to thereby gate a well regulated reference voltage to the proper input resistance of the network in the "on" position and connect a ground reference to the "off" position. The transistor switches are driven by means of a five stage binary counter, or dot counter, 70 as shown in FIG. 2. Each of transistor switches 72 and 74, driving character resistor networks 76 and 78, respectively, is associated with a dot rather than a character. Thus, the first transistor switch applies a signal to the first input resistor of both the X, or horizontal, and the Y, or vertical, resistor network for the character, and similarly, the second switch is associated with the second resistors. Resistor networks 76 and 78 are illustrated in FIG. 4, it being understood that the signals applied by transistor switches 72 and 74 are selectively applied from the top to the bottom resistor of each network. By way of example, to provide the minor deflection voltages for generating the character "T" as shown in FIG. 3, it will be understood that resistors 80 through 86 of network 76 are of equal value to provide a constant horizontal minor deflection voltage for the initial four beam positions indicated in FIG. 3, and that resistor 88 has a markedly different value. Resistors 88 through 96, which determine the remaining five minor horizontal deflection voltages, are selected in accordance with a progressive resistance valuation, to position the electron beam to locations five through nine as shown in FIG. 3, and resistor 92 exhibits the same value of resistance as resistors 80 through 86. In a similar manner, it should be noted that the necessary resistors in Y character resistor network 78 are selected such that resistors 106 through 114 are each of equal resistance, defining the minor vertical deflection voltage for beam positions five through nine, while resistors 98 through 106 are again selected to have a progressive resistance valuation in order to obtain the required vertical deflections of the electron beam for positions one through five.

The output signals from resistor networks 76 and 78, which are driven from data counter 70 and transistor switches 72 and 74 in a sequential manner, are step functions which correspond to the horizontal and vertical component voltages required to generate a particular character. As above described, these step function signals are simultaneously generated for all characters. These signals are in turn applied to a pair of horizontal and vertical diode switches 116 and 118 again associated with a particular character. A single set of these switches are gated "on" by the presence of the code representing the character to be displayed.

Figure 2:
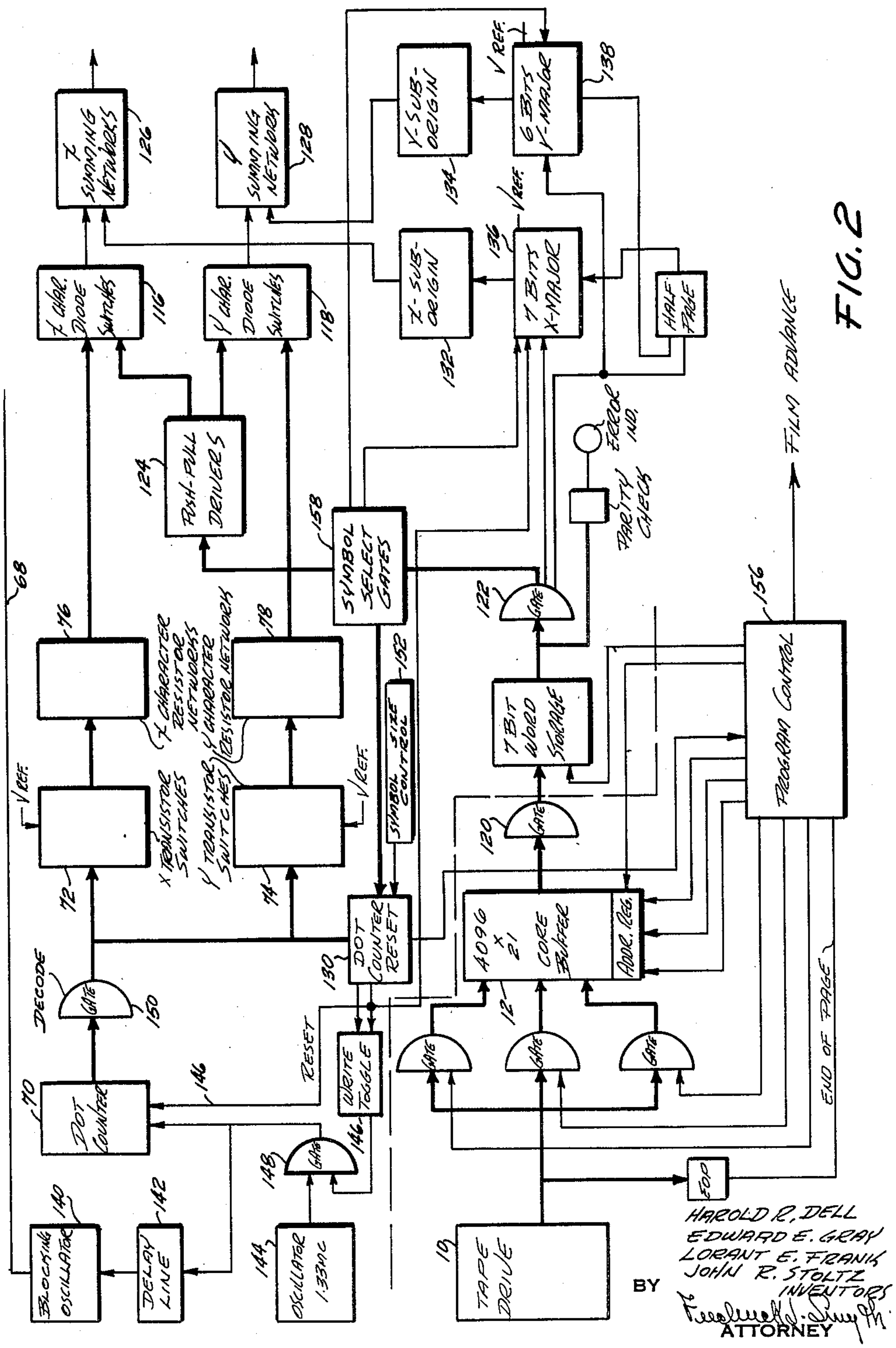
FIG. 2 is a detailed block diagram of a portion of the apparatus shown in FIG. 1.

As shown in FIG. 2, character codes received from core buffer 12 are translated through character decoder gates 120 and 122 and applied by means of a driver stage 124 to the diode switches associated with the corresponding character. Opening of these switches allows the minor deflection signals to pass through to the respective horizontal and vertical summing networks 126 and 128. Additionally, the decoder character signal is also applied to a dot counter reset gate 130 which, in turn, resets dot counter 70 to zero, in preparation for its count of the dots required to generate that character.

In accordance with system requirements, the character positioning is similar to the standard "typewriter" mode of operation. Associated with each of the character spaces, and at the same relative position in each such area, is a suborigin point, as by way of example 66 in FIG. 3. The blanked beam of the cathode ray tube is positioned to this suborigin point prior to the writing of each character. Each of the dots which comprise each character are referenced to this suborigin point by the major deflection signals developed by generators 132 and 134, each of which comprise two precision resistance-ladder networks associated with counters 136 and 138, respectively. The counters consist of a six stage vertical counter 138 which determines the horizontal position in which the character is written and a seven stage horizontal counter 136 which determines the location along the line at which the character is written. The outputs of these counters drive transistor switches which in turn supply a well regulated reference voltage to the precision suborigin deflection resistor networks 132 and 134. The outputs of these two resistor ladder networks are furnished as the major deflection signal inputs to the cathode ray tube deflection system. These signals, generated just prior to the writing of the first dot of any character remain constant until all of the dots of the character have been generated. Upon completion of all of the dots required for a particular character, horizontal major deflection counter 136 is advanced in preparation for the writing of the next character. Vertical major deflection counter 138 is advanced by a "carriage return" code from decoding gates 120 and 122.

The beam of the cathode ray tube is unblanked for each dot only after sufficient setting time for both the major and minor deflection voltages. During the time interval that the deflection system of both axes are stationary, a 0.5 microsecond pulse generated by an intensity controller consisting of a blocking oscillator 140 and a delay line 142 turns the beam of the cathode ray tube on along line 68. The beam then writes a single dot on the face of tube 18 and is turned off before being deflected to the next dot position. Thus, each character is formed by a series of stationary, uniformly lighted dots, which coalesce to form a well defined character. Up to 16 dots are used to form normal sized characters, and up to 32 dots are used to form larger sized characters.

As hereinabove described, upon completion of a character, horizontal major deflection counter 136 is advanced to the next position. The advance signal to counter 136 is derived from comparison networks in data counter reset unit 130. Additionally, an output from the reset circuitry turns off the advance pulses to dot counter 70 supplied by an oscillator 144 by means of a write toggle unit 146 and a gate 148 and simultaneously resets dot counter 70, along a line 146, in preparation for the next character. Receipt of the next character from buffer 12, after being translated through the character decoding matrix, sets write toggle 146, which, in turn, enables gate 148 and allows pulses from oscillator 144 to advance dot counter 70. It should also be noted that the pulses from oscillator 144 are applied to delay line 142, which has a delay time sufficient to allow the minor deflection signals, initiated by dot counter 70, to flow through decode gates 150 and the respective pair of diode gates selected by the character code, and position the beam to the selected location. The fall of this delayed pulse triggers blocking oscillator 140 to unblank the beam of cathode ray tube 18, the unblanking pulse being thereafter turned off prior to the next advance pulse to dot counter 70. This procedure is repeated for each successive dot until all dots of the character have been written. When the value from dot counter 70 is equal to the number of the dots for the previously selected character, a coincidence signal from dot counter reset unit 130 resets dot counter 70 and again advances horizontal major deflection counter 136 in readiness for the next character code. Depending on the particular character size required, twice as many dots than are normally used are programmable to generate a character, the change in character, or symbol, size being determined by symbol size control 152 as hereinafter more particularly described.

The character writing speed of character generator 16 is dependent upon the number of dots required to form a character. Dot counter 70 is driven by oscillator 144 which operates at a frequency of 1.33 megacycles, that is, at a rate of 0.75 microsecond per dot. Assuming that the average number of dots per alpha-numeric character is 13 out of a possible 16 dots for normal sized characters, about 10 microseconds is required to display a character. If six microseconds is provided for advancing horizontal deflection counter 136 and transient setting time before dot counter 70 is operated, then each character requires approximately 16 microseconds to be generated and displayed upon the face of cathode ray tube 18, after a character code is transferred from core buffer 12. Further, each "carriage return" requires about 20 microseconds settling time.

Figure 6A:
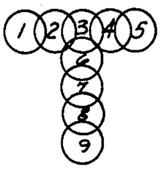
Figure 6B:
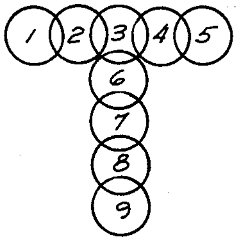
Figure 6D:
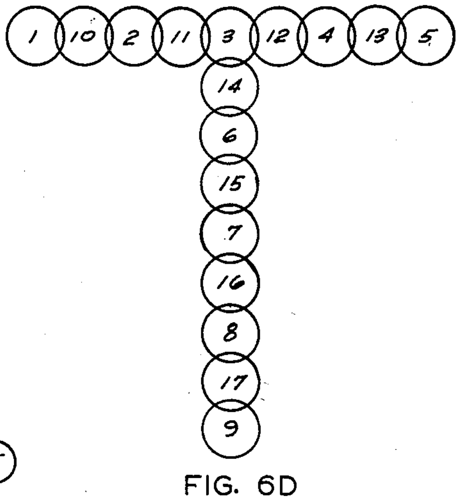
Figure 6C:
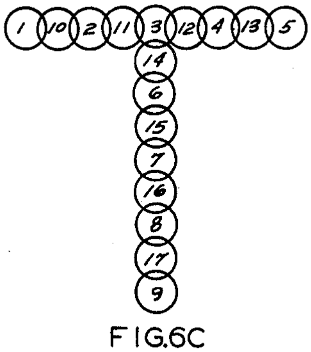

Additionally, improved character generator 16 provides four symbol sizes to cover the necessary size ranges for headings, subtitles, text, and so forth, which vary from normal size to a size three times normal size. This capability of changing symbol size, either manually or by program control unit 156, is provided by using a combination of dot-pattern interlace, control of minor deflection sensitivity, and cathode ray tube spot size control. Also, it is necessary that attention be paid to programming the position of the enlarged symbols. Counters 136 and 138 are properly advanced when enlarged symbols are selected by manual or program control, by means of symbol select gates 158 which provide the necessary control signals. As shown in FIGS. 6A through 6D, it is readily possible, through a combination of spot sizes and conventional interlace techniques, to obtain four separate character sizes upon the face of cathode ray tube 18. By way of example, FIG. 6A similar to FIG. 3, represents the normal, or minimum, character size. It should be noted, and this emphasizes an important feature of the apparatus of the invention, that in FIG. 6A the individual dots are generated in inverse order to that of the dot generation shown and explained with respect to FIG. 3, which feature is obtained merely by altering the resistor values in networks 76 and 78. Next, by increasing the spot size a larger character, as shown in FIG. 6B, is obtained. Again, employing the standard dot size together with the additional dots controlled by unit 152, a still larger character is generated employing the interlace technique as illustrated in FIG. 6C. Finally, by combining both increased dot size and interlace technique, the major character size of FIG. 6D is attained. In summary, the following table shows the interrelation of parameter required to achieve the four symbol sizes shown in FIGS. 6A through 6D.

| Symbol Size | Interlace Factor | Minor Deflection Sensitivity | Spot Size | FIG. |
|---|---|---|---|---|
| Normal | 1:1 | 1 X | 1 X | 6A |
| 1.5 X | 1:1 | 1.5 X | 1.5 X | 6B |
| 2 X | 2:1 | 2 X | 1 X | 6C |
| 3 X | 2:1 | 3 X | 1.5 X | 6D |

Returning again now to FIG. 1, image rotation assembly 19 comprises, basically, a double pole switch and an operational amplifier. When it is desired to change from end-to-end frame orientation to side-by-side frame orientation, the switch, normally located on the master control panel, is transferred. The results in first coupling the vertical deflection signal from character generator 16 to the horizontal deflection coils indicated as 200. The normal horizontal deflection signal goes to the vertical deflection coil 202 after first passing through the operational amplifier which is effective to reverse its polarity. Thus, the image formed upon the face of cathode ray tube 18 is effectively rotated through an angle of 90 degrees. The operational amplifier employed is a chopper stabilized unit, with the chopper section being used to drift-stabilize the wide bandwidth section, which may be of the type disclosed in copending application Serial No. 182,212, filed March 26, 1962, on behalf of E. E. Gray and K. E. McFarland and assigned to the assignee of the instant application. This operational amplifier features all silicon transistors of the epitaxial variety, and has a wide bandwidth and high gain to enable it to pass high frequency signals with exceptional fidelity. For this reason, it is ideally suitable for use in image rotation assembly 19 without causing degradation in the signal applied to vertical deflection coil 202.

Dynamic focus computer 204 is employed to continuously maintain the spot on the face of cathode ray tube 18 in focus regardless of its position thereon. Normally, the spot tends to defocus because of the following effects:

(1) Beam deflection by fringe fields at the exit end of the deflection yoke causing astigmatism; and (2) Beam crossover because of the circular orbit of the rays in the deflection field.

Figure 5:
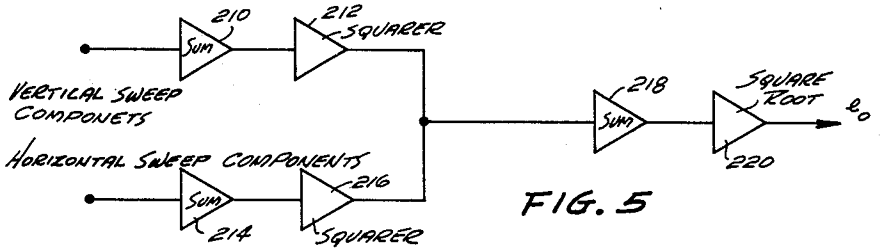
FIG. 5 is a detailed block diagram of a portion of the apparatus shown in FIG. 2.

The first effect is a function of the particular yoke employed and exists even in the precision unit used in the present apparatus. Both effects, however, are overcome by altering the current in focus coil 206 as a function of the spot deflection angle. As shown in FIG. 5, computer 204 includes six operational amplifiers 210 through 220 wherein the vertical sweep components are summed and squared in amplifiers 210 and 212, the horizontal sweep components are summed and squared in amplifiers 214 and 216, the resultant signals being combined in a further summing amplifier 218, and the square root thereof obtained by amplifier 220 to provide output signal $e_0$ for focus coil 206 wherein $e_0$ is defined by the following equation $$e_0=k\sqrt{(H \cos \theta \pm V \sin \theta)^2+(H \sin \theta \pm V \cos \theta)^2}$$

Film movement controller 38 preferably contains a Geneva movement which consists essentially of a cam activating a film transport shuttle that carries the film to and from the aperture and causes a pair of pinch rollers to move the film. A drive motor receives a frame advance code from the magnetic tape through the film movement controller. In the controller 38, this code, by means of a transistor switch closes the circuit which energizes the motor. After the motor has turned almost one revolution, a pair of contacts mounted on its shaft closes and causes the transistor switch to open. The motor stops until the next frame advance signal is received to start it again. Thus, the motor cannot turn more than one revolution at a time and the film advances one frame at a time. Because the frame advance code appears on the tape only after all the frame data, the film cannot advance until all the information has been written on the frame. Controller 38 also opens and closes shutter 40 and the film and shutter movements are so synchronized that the shutter is closed during the entire time interval that the film is in motion.

What has been described is an improved data conversion apparatus wherein images to be placed upon a film are derived from a cathode ray tube which generates all the required characters. A slide projector is also provided to furnish various formats of invariant data in either the normal or rotated modes, as well as a digital readout device for providing bar codes and a second digital readout device for providing film identification label information. Intelligence from these various sources is added to the main optical path by means of beam splitters, or partially silvered mirrors, chosen to optimize the intensity of the illuminated source. A shutter is provided to blank out the image during the time interval in which the film is being transported. Further, a remotely operated shifting mirror assembly is provided to allow additional information to be placed upon the film. Finally, image information is taken from the main optical path and photographed by means of an auxiliary camera and a beam splitter in combination.

Although the apparatus has been described solely in terms of converting data stored on magnetic tape into data stored on microfilm, it should be understood, and this is yet another important feature of the invention, that data from a source including but not limited to punched cards, paper tape, printed records, and magnetic disks, may be so connected whether or not it is desired to combine invariant data with the data so stored.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. A data conversion system for transferring data stored on magnetic tape onto photographic film comprising, (*a*) means for converting data stored on said magnetic tape into first electrical signals representative of said data and into second electrical signals representative of associated control signals;

(*b*) a cathode ray tube operable to provide an intensity modulated visual display;

(*c*) a first of said second electrical signals effective to intensity modulate said display, a second of said second electrical signals effective to determine the resolution of said display, and a third of said second electrical signals effective to determine the sequence in which individual portions of said display are arranged whereby said second electrical signals in combination regulate the size of said display;

(*d*) means for modifying said first electrical signals to serially provide deflection signals for said cathode ray tube whereby said data is displayed on the face of said tube; and (*e*) photographic means controlled by said converting means for recording said displayed data in synchronism with said modifying means 2. The apparatus of claim 1 including, (*a*) at least one film slide projector;

(*b*) a plurality of film slides for said at least one projector, each containing predetermined data;

(*c*) means controlled by said converting means for selectively positioning any of said slides in said projector; and (*d*) means for optically combining said displayed data and said projected data whereby said photographic means is effective to simultaneously record said combined data.

3. An apparatus for converting stored digital data words into stored printed data words comprising, (*a*) means for serially generating electrical signals in accordance with the value of each of said digital words;

(*b*) a cathode ray tube including focus, horizontal deflection, and vertical deflection coils associated therewith for controlling the position and size of the electron beam;

(*c*) counter means coupled to said horizontal and vertical deflection coils and responsive to certain ones of said electrical signals for providing major horizontal and vertical deflection signals;

(*d*) character generating means for providing minor horizontal and vertical deflection signals in response to certain others of said electrical signals;

(*e*) means coupling said minor deflection signals to said deflection coils in addition to said major deflection signals in order to form visual representations of said data words;

(*f*) circuit means responsive to a further one of said electrical signals and coupled to said counter means and said character generating means operable to alter the size of said visual representation; and (*g*) camera means for recording said visual representations.

4. The apparatus of claim 3 including means for logically combining said horizontal and vertical deflection signals, and means coupling said combined signals to said focus coil whereby said electron beam remains in focus independent of the magnitudes of said horizontal and vertical deflection signals.

5. The apparatus of claim 3 including, (*a*) first and second film slide projectors;

(*b*) a plurality of film slides for each of said projectors;

(*c*) first means responsive to particular ones of said electrical signals for positioning one of said slides in each of said projectors to provide first and second light beams containing the information recorded on said first and second selected slides, respectively;

(*d*) first optical means for combining said first and second light beam to form a third light beam; and (*e*) second optical means for combining said third beam and said visual representations whereby said first and second light beams and said visual representations thereafter traverse an identical optical path.

6. The apparatus of claim 5 including second means responsive to particular others of said electrical signals to control the operation of said camera means whereby said character generating means and said first and second responsive means sequentially operate in predetermined time relationship.

7. The apparatus of claim 5 wherein said first and second optical means are beam splitters.

8. An apparatus for recording combined variant and invariant data on photographic microfilm comprising, (*a*) a source of variant data, said source including a magnetic tape drive unit and a magnetic tape having variant data and instruction and control signals stored thereon;

(b) a buffer storage device;

(c) means transmitting said variant data from said magnetic tape to said buffer storage device;

(d) a character generator;

(e) a cathode ray tube including at least a control grid and horizontal and vertical deflection means;

(f) means coupling said character generator between said buffer storage device and said control grid and said horizontal and vertical deflection means, said character generator operable to provide horizontal and vertical deflection signals as well as an intensity blanking signal to thereby successively position the electron beam of said cathode ray tube to provide a visual representation of said variant data from said buffer storage device while blanking said beam during the time interval when the beam traverses a discontinuity in a character and when it moves between characters;

(g) at least one slide projector including a plurality of slides storing invariant data;

(h) means coupling said instruction and control signals to said at least one slide projector;

(i) optical means combining said visual representation of variant data and said selected projected variant into a common light beam;

(j) a microfilm transport mechanism responsive to said instruction and control signals for driving a microfilm strip; and (k) means positioning said microfilm transport mechanism in spaced relationship to said cathode ray tube in order that said microfilm intercept said common light beam.

References Cited in the file of this patent

UNITED STATES PATENTS

| | | |
|---|---|---|
| 2,629,829 | Daly | Feb. 24, 1953 |
| 2,680,055 | Hayward et al. | June 1, 1954 |
| 2,680,148 | Purington et al. | June 1, 1954 |
| 2,680,669 | Shepard et al. | June 8, 1954 |
| 2,751,275 | Mansberg | June 19, 1956 |
| 2,871,400 | Buntenback | Jan. 27, 1959 |
| 2,898,176 | McNaney | Apr. 4, 1959 |
| 2,906,584 | Hammer et al. | Sept. 29, 1959 |
| 2,927,215 | Allen et al. | Mar. 1, 1960 |
| 2,984,537 | Jarvis et al. | May 16, 1961 |
| 3,014,091 | McLean | Dec. 19, 1961 |
| 3,047,870 | Bousky | July 31, 1962 |
| 3,051,955 | Pfleger et al. | Aug. 28, 1962 |
| 3,071,762 | Morgan | Jan. 1, 1963 |
| 3,078,454 | Corson et al. | Feb. 19, 1963 |